UNITED STATES PATENT OFFICE.

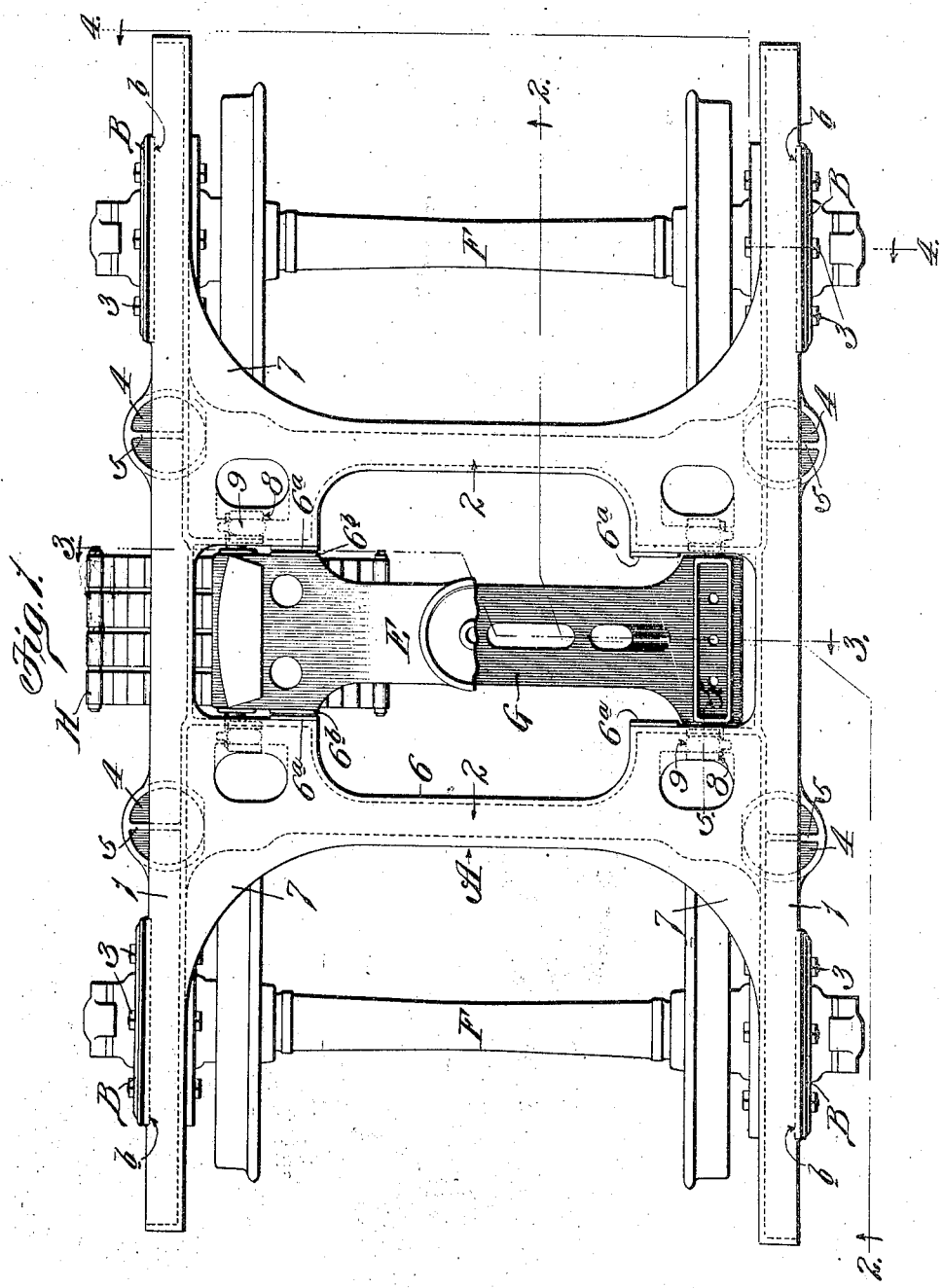

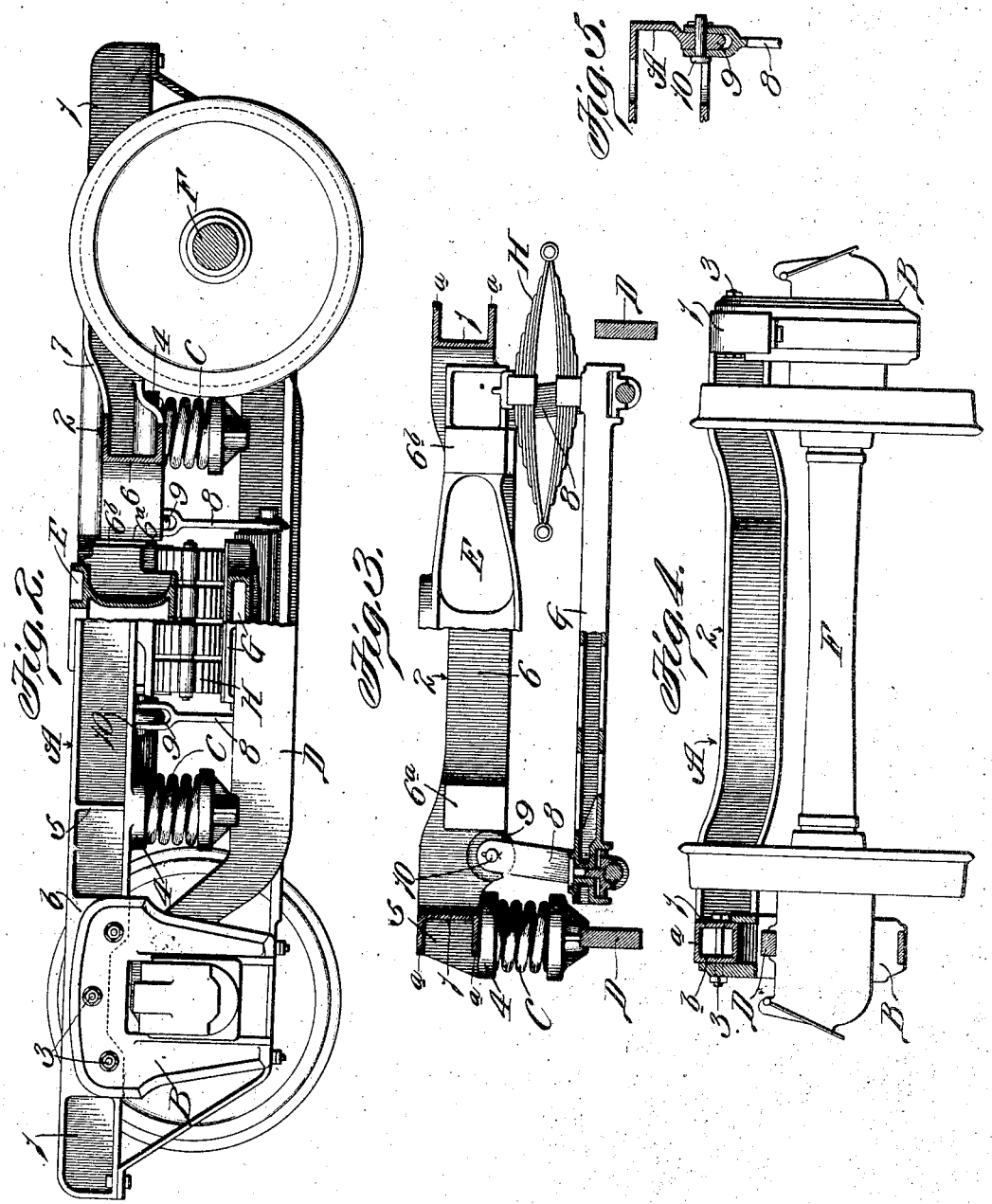

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

FOUR-WHEEL TRUCK.

1,015,010.   Specification of Letters Patent.   Patented Jan. 16, 1912.

Application filed September 30, 1911. Serial No. 652,064.

*To all whom it may concern:*

Be it known that I, HARRY E. DOERR, a citizen of the United States, residing at St. Louis, Missouri, have invented a certain new and useful Improvement in Four-Wheel Trucks, of which the following is a full, clear, and exact description, such as will enable others skilled in the art to which it appertains to make and use the same.

This invention relates to car trucks, and has for its object to provide a four-wheel truck frame that is light, strong and inexpensive to manufacture.

Figure 1 of the drawings is a top plan view partly broken away of a four-wheel truck frame constructed in accordance with my invention; Fig. 2 is a side elevation and vertical longitudinal sectional view taken on the line 2—2 of Fig. 1; Fig. 3 is a vertical cross sectional view taken on the line 3—3 of Fig. 1; Fig. 4 is an end elevation and vertical cross sectional view taken on the line 4—4 of Fig. 1; and Fig. 5 is a detail sectional view taken on the line 5—5 of Fig. 1.

Referring to the drawings which illustrate the preferred form of my invention, A designates a one-piece casting which comprises a pair of wheel-pieces 1, and two single transoms 2 that connect said wheel-pieces together. The wheel-pieces 1 are preferably channel-shaped in cross section and are arranged with their horizontal flanges $a$ projecting outwardly, as shown in Fig. 3. The pedestals B of the truck are removable, and at the points where they are detachably connected to the wheel-pieces 1, said wheel-pieces are provided with short outside vertical webs $b$ that are integrally connected to the horizontal flanges $a$, thus producing box-shaped portions which are embraced by the upper ends of the pedestals B and through which the fastening devices 3 pass, as shown in Fig. 4. By forming the wheel-pieces in this manner I obtain an exceptionally strong and rigid truck frame for the short webs $b$ reinforce those portions of the wheel-pieces 1 which are subjected to great strains, and they also brace the pedestals and the fastening devices which secure the pedestals to the wheel-pieces.

The wheel-pieces 1 are provided on their under sides with integral spring seats or pockets 4 which receive the upper ends of the spring C that are interposed between the wheel-pieces and the equalizers D. Said spring seats 4 are of greater diameter than the width of the horizontal flanges $a$ of the wheel-pieces and consequently project laterally in opposite directions from said wheel-pieces, as shown in Fig. 3. The portions of said spring seats which project outwardly from the wheel-pieces are reinforced and strengthened by vertical ribs 5 which are integrally connected to the spring seats and to the vertical and horizontal flanges of the wheel-pieces 1, and the portions of said spring seats which project inwardly from the wheel-pieces are reinforced and strengthened by the transoms 2 to which they are integrally connected, as shown in Fig. 3. The transoms 2 are so designed and arranged that the truck is practically as strong as a truck provided with double transoms on each side of the bolster, thereby reducing the weight of the truck and the cost of manufacturing same. Said transoms 2 are located some distance away from the bolster E, preferably about midway between the bolster and the wheel axles F, as shown in Fig. 1, and each transom consists of a relatively narrow, intermediate or central portion and two relatively wide end portions that coöperate with the end portions of the other transom to guide the bolster and prevent it from swaying. The transoms 2 are substantially channel-shaped in cross section and comprise top and bottom flanges that are integrally connected to the horizontal flanges $a$ of the wheel-pieces, and the vertical webs 6 of said transoms are integrally connected at their outer ends to the vertical webs of the wheel-pieces 1. I prefer to flare the top flanges of the transoms 2 outwardly, as shown in Fig. 1, so as to form gussets 7 at the intersections of the top flanges of the transoms and wheel-pieces.

The wide end portions of the transoms are spaced just far enough apart to receive the bolster E, and the vertical webs of the wide portions of said transoms are provided with chafing plates 6ª, as shown in Fig. 3, that coöperate with chafing plates 6ᵇ on the bolster, as shown in Fig. 1. The spring plank G which supports the springs H on which the bolster rests is carried by links 8 having bifurcated upper ends which straddle depending ears or lugs 9 on the under side of the transoms 2, as shown in Figs. 2, 3 and 5, said links and lugs being pivotally connected together by means of fastening devices 10.

A four-wheel truck frame of the construction above-described weighs less than the cast metal four-wheel trucks heretofore in use because it comprises only two transoms; it is practically as strong, however, as a cast metal truck provided with double transoms on each side of the bolster for the single transoms are located approximately midway between the bolster and the wheel axles. The way in which the pedestals are connected to the wheel-pieces and the manner of connecting the spring plank and supporting links to the transoms insures a structure that is strong and rigid; and another very desirable feature of such a truck is the low cost of manufacturing same due to the saving of metal in eliminating one pair of transoms and also to the fact that the wheel-pieces and transoms are so designed that they can be accurately fitted to the parts with which they coöperate without machining.

Having thus described my invention, what I claim as new and desire to secure by Letters Patent is:

1. A four-wheel truck having a frame which comprises a single casting that consists of two wheel-pieces and two single transoms integrally connected together, the end portions of said transoms being wider than the intermediate portions of same so as to act as guides for the bolster of the truck.

2. A four-wheel truck having a frame which comprises a single casting that consists of two channel-shaped wheel-pieces and two channel-shaped transoms whose horizontal flanges and vertical webs are integrally connected together, the intermediate portions of said transoms being relatively narrow and arranged approximately midway between the bolster and the wheel axles of the truck.

3. A four-wheel truck having a frame that comprises a single casting which consists of wheel-pieces and a pair of single transoms integrally connected together, the transoms being reduced intermediate their ends so that the central portions of same are spaced away from the bolster of the truck, and integral lugs projecting downwardly from the under sides of said transoms for supporting the links which carry the spring plank of the truck.

4. A four-wheel truck having a frame that comprises a single casting which consists of channel-shaped wheel-pieces and a pair of single channel-shaped transoms having their horizontal flanges and vertical webs integrally connected together, the intermediate portions of said transoms being relatively narrow, integral spring seats or pockets on the under sides of said wheel-pieces which are integrally connected to the transoms, vertical ribs connected to the vertical webs and horizontal flanges of said wheel-pieces for reinforcing and strengthening the portions of said spring pockets which project outwardly from the wheel-pieces, depending lugs on the under sides of said transoms for supporting the links which carry the spring plank of the truck, and pedestals secured to box-shaped portions of said wheel-pieces.

In testimony whereof I hereunto affix my signature in the presence of two witnesses, this 22nd day of September 1911.

HARRY E. DOERR.

Witnesses:
S. S. KNIGHT,
WM. G. BRIDGEMAN.